United States Patent [19]

O'Connell

[11] 4,113,217
[45] Sep. 12, 1978

[54] APPARATUS FOR REMOVABLY MOUNTING EQUIPMENT TO A VEHICLE

[75] Inventor: Joseph J. O'Connell, Albuquerque, N. Mex.

[73] Assignee: Scientific Dimensions, Inc., Albuquerque, N. Mex.

[21] Appl. No.: 785,326

[22] Filed: Apr. 7, 1977

[51] Int. Cl.² .................. E05B 73/00; F16B 41/00
[52] U.S. Cl. ................................. 248/221.3; 292/87
[58] Field of Search ................... 248/221.3, 222.1; 70/58, 258; 292/DIG. 61, 13, 19, 87; 24/230 R; 312/246

[56] References Cited

U.S. PATENT DOCUMENTS

| 517,703 | 4/1894 | Ludinig | 292/87 |
|---|---|---|---|
| 564,661 | 7/1896 | Tollner | 292/87 |
| 3,586,394 | 6/1971 | Hecksel | 312/246 X |
| 3,711,140 | 1/1973 | Onori | 292/87 |
| 3,822,049 | 7/1974 | Saunders | 70/258 X |

FOREIGN PATENT DOCUMENTS 54,014 3/1947 France ........................ 292/87

Primary Examiner—J. Franklin Foss
Attorney, Agent, or Firm—Richard A. Bachand

[57] ABSTRACT

Apparatus for mounting equipment to a vehicle includes first and second frames adapted for sliding engagement between downwardly extending wing members of the top frame within grooves formed by bends along opposite edges of the bottom frame. A spring locking member attached to the bottom frame is received within an oblong hole in the upper frame in a locked and engaged position, to urge the wing members into engagement with the bent edges of the lower frame. The spring locking member is located within a slot in an upwardly extending portion of the lower frame to constrain it only to upward and downward movement. In the engaged position the locking member prevents movement in orthoginal or transverse directions thereby securing firmly the first and second frames and equipment carried thereby to the vehicle.

3 Claims, 3 Drawing Figures

APPARATUS FOR REMOVABLY MOUNTING EQUIPMENT TO A VEHICLE

BACKGROUND OF THE INVENTION

1. Field of the Invention

This invention relates to improvements in equipment mounting apparatuses, and more particularly to improvements in locking means to maintain the relative positions of first and second equipment mounting frames in an engaged relationship.

2. Description of the Prior Art

Recently, with the increased interest in mobile communication equipment, such as Citizen's Band, amateur, and in fact, even commercial radio services, it has been becoming a widespread practice to remove the particular communication equipment vehicle in which it is used during periods of inactivity or non-use of the equipment to discourage its theft. To facilitate such easy removal, various mounting appliances have been proposed and used. Typically, such appliances employ first and second frames which have a facility enabling sliding engagement therebetween. Ordinarilly, a plug which carries power supply and frequently microphone and antenna connections are brought into engagement when the frames are in operative position.

Nevertheless, such prior art frames have been unsatisfactory in many respects. Typically, the frames are inadequately locked one with respect to the other, resulting in excessive vibration and noise, and which, in fact, may have deleterious effects upon the connection plug, and constitute a general annoyance to the equipment user.

Although efforts have been made to insure that the mounting appliances, once in an operative position, do not slide apart, that is, lock in place along the axis of the sliding engagement, in so far as is known to applicant, no effort has been made to stabilize the relative movement between the parts of the appliance in directions transverse to the sliding direction.

SUMMARY OF THE INVENTION

In light of the above, it is therefore an object of the invention to provide apparatus for mounting equipment to a vehicle which enables rapid removal of the equipment with ease, and yet which firmly, solidly locks the equipment in place in use.

It is another object of the invention to provide a novel locking mechanism for maintaining the relative positions of first and second planar equipment carrying and mounting frames.

These and other objects, features, and advantages will become apparent to those skilled in the art from the following detailed description when read in conjunction with the accompanying drawings and appended claims.

In its broad aspect, the invention provides an apparatus for removably mounting equipment to a vehicle. The apparatus includes first and second generally planar frames, one of the frames being adapted for attachment to the equipment and the other of the frames being adapted for attachment to the vehicle. The edges of the second frame are formed to define grooves along opposite edges thereof, and the first frame has bends forming wings to enable its edges to be slideably received within the grooves of the second frame. Additionally, an oblong hole is formed in the first frame for receiving a locking member. A spring locking member is attached to the second frame at one end, and is biased in a direction away from the second frame in the direction of the first. The spring locking member has a bend to present a portion thereof to be received within the oblong hole, thereby urging the wings of the first member into engagement with the walls of the groove at the edges of the second member, locking the first and second frames against sliding relative movement. Additionally, in one embodiment of the invention, a member attached to the second frame extends in the direction of the first frame, and has a hole with walls engaging the spring locking member to constrain it from movement transverse to the sliding direction and to the direction in which the spring locking member is biased.

In the engaged positions, therefore, the first and second members are firmly locked against movement in three transverse directions by virtue of the spring member and its engagement within the oblong hole, together with the spring engaging member of the second frame.

BRIEF DESCRIPTION OF THE DRAWING

The invention is illustrated in the accompanying drawing wherein.

In the various figures of the drawing, like reference numerals are used to denote like parts.

DETAILED DESCRIPTION OF THE PREFERRED EMBODIMENTS

Figure 1:
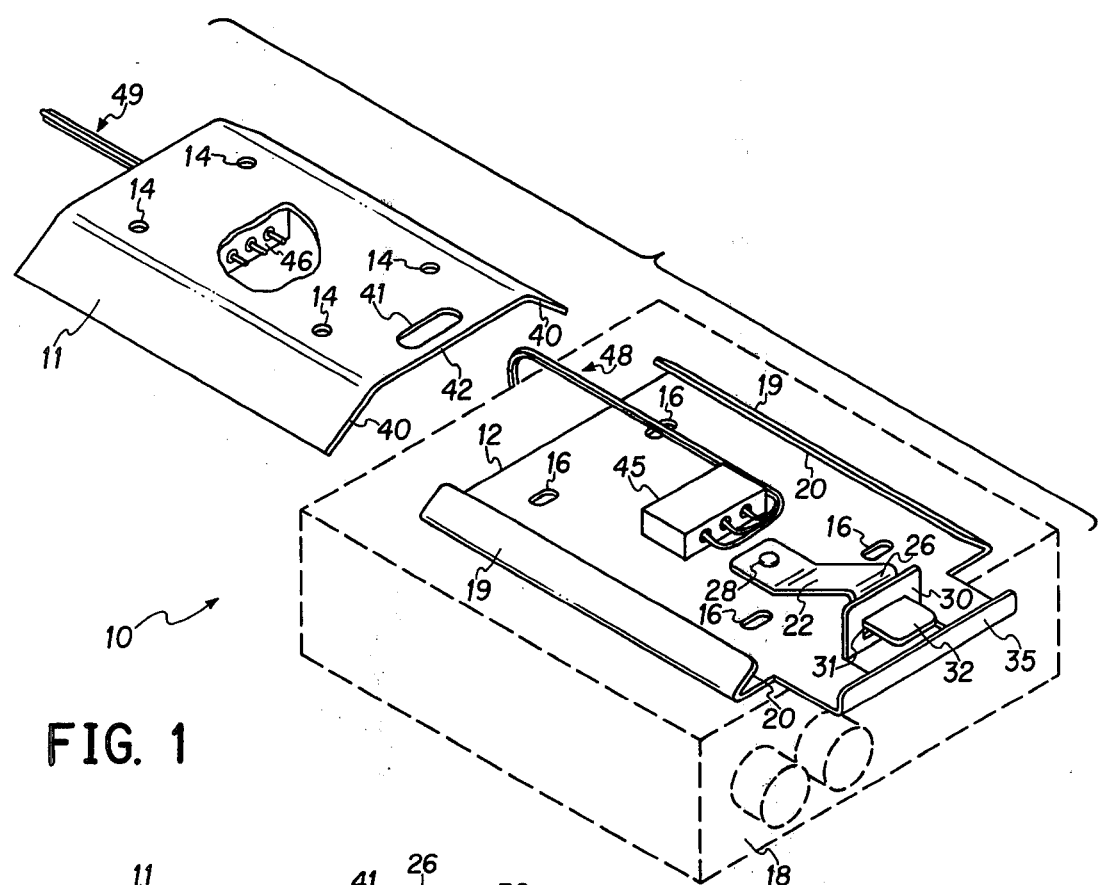
FIG. 1 is a perspective view of the equipment mount of the invention illustrating the two halves thereof separated from each other.

The mounting appliance or apparatus 10 of the invention is shown in FIG. 1, and includes first and second planar frames 11 and 12. The frame 11 includes holes 14 by which it can be attached to a vehicle, for example, under the dash or other accessible location. Likewise, the frame 12 includes holes 16 for attachment to the equipment desired to be mounted, for example, a two way radio or the like, shown by dotted lines 18.

The edges 19-19 of the frame 12 are upwardly bent to define grooves 20-20 along opposite edges of the frame 12 to receive the top frame 11, as presently described. Additionally, a spring locking member 22 is fastened by a rivet 23 or the like to the frame 12. The spring locking member 23 has a bias urging it in a normally upwardly direction, and is bent to present a curved upward ridge 26 to engage the upper frame 11, as described below. A member 30 attached to the frame 12, or formed as a part of it as illustrated, has a hole 31 through which a tongue portion 32 of the spring locking member extends. The walls of the hole 31 are of such spacing whereby the tongue 32 of the spring locking member 23 is constrained strictly to movement upwardly and downwardly from the frame 12.

Optionally, a handle portion 35 can be included, as shown, as a part of the lower frame 12 to facilitate easy separation of the lower frame 12 and the equipment 18 carry thereby from the upward frame 11.

The upward frame 11 includes bends along its lingth to define wing portions 40-40 to enable the upper member 11 to slidingly engage lower member 12 within the grooves 20-20. An oblong slot 41 is formed in a central location adjacent a forward edge 42 of the upper frame 11 for engagment with the spring locking member 22, as below described in detail.

Finally, a plug means is included having halves 45 and 46 respectively attached to the lower frame 12 and upper frame 11 to be brought into firm mating engagement when the upper frame 11 is in its forward sliding position with respect to the lower frame 12. The wires 48 from the plug half 45 are attachable to various connections of the equipment 18, and the corresponding wires 49 of the plug half 46 are attachable to the various sources of the vehicle, such as the power supply, antenna, and the like.

Figure 2:
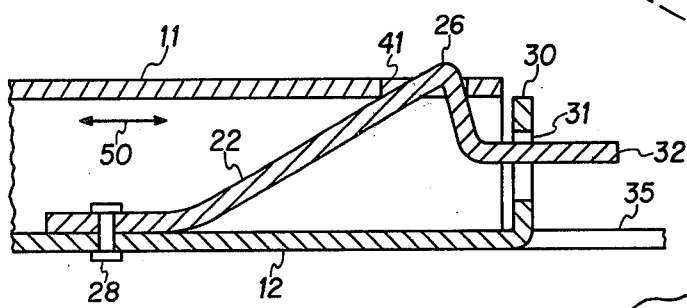
FIG. 2 is a cut-away side view of a portion of the equipment mount of the invention, showing the engagement of the locking member maintaining the relative positions of the first and second halves of the mount, taken at 2—2 in FIG. 3.
Figure 3:
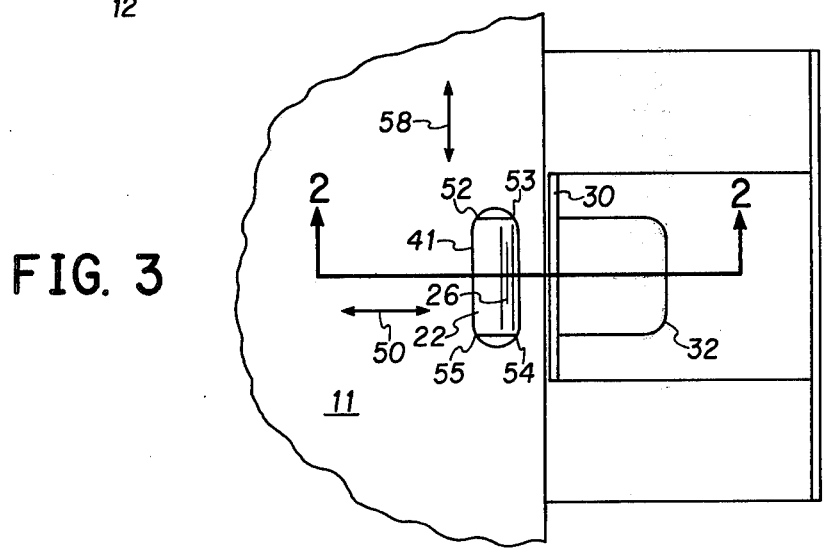
FIG. 3 is a plan view of a portion of the mounting apparatus of the invention, showing the spring lock engagement between the two halves thereof.

The details of the spring locking member and its engagement within the oblong hole 41 are shown in detail in FIGS. 2 and 3. As shown, the spring locking member 22 has its bend portion 26 extending slightly through the opening of the hole 41, thereby constraining the sliding movement of the upper frame 11 with respect to the lower frame 12 in the direction indicated by the arrow 50. Additionally, as can be seen in FIG. 3, in the engaged position, the bent portion 26 is designed whereby the edges of the spring locking member engage the opposite curved walls of the oblong hole 41, as indicated by the reference numerals 52-55. By virtue of this engagement, in addition to reinforcing the locking action against the direction of sliding travel 50, the transverse direction of travel, indicated by the arrow 58 is additionally locked (the tongue portion 32 being constrained within the hole 31 of the upward member 30). Since the spring locking member 22 is biased normally upwardly, because of the positive engagement between the spring locking member and the walls of the hole 41, the upper frame 11 is urged upwardly, thereby urging the wing members 40-40 into engagement with the walls 19-19, thereby locking the relative up and down motion between the upper and lower frames 11 and 12.

Thus, in the sliding locked position, the relative motion between the upper and lower frames 11 and 12 is constrained from motion in three transverse or orthogonal directions, thereby providing secure vibration free connection therebetween.

Although the invention has been described and illustrated with a certain degree of particularity, it is understood that the present disclosure has been made only by way of example and that numerous changes in the details of construction and combination and arrangement of parts may be resorted to without departing from the spirit and scope of the invention as hereinafter claimed.

I claim:

1. Apparatus for removably mounting equipment to a vehicle, comprising:
    first and second generally planar frames, one of said frames adapted for attachment to the equipment and another of said frames adapted for attachment to the vehicle,
    members defining grooves along opposite edges of said second frame,
    said first frame having bends to form wings slideably receivable in a direction along said grooves and having a centrally located oblong hole for receiving a spring locking member,
    and a spring locking member biased in a direction away from and attached at an end to said second frame, having a bend for engagement with walls of said oblong hole adapted to engage said oblong hole at least at four opposing locations to constrain the motion therewithin in a direction transverse to said slideable direction, to urge said wings of said first into engagement with said grooves of said second frame to constrain any relative motion therebetween, and to lock said first and second frames against sliding relative movement.

2. Apparatus of claim 1 further comprising:
    a member attached to said second frame extending in the direction of said first frame having a hole with walls engaging said spring member to constrain said spring member from movement transverse to said sliding direction and to said biased direction.

3. Apparatus of claim 2 further comprising plug means having mating halves respectively attached to said first and second frames to be held in firm mating engagement when said locking member is located within said oblong hole.

* * * * *